US012753857B1

(12) United States Patent
Nicholson et al.

(10) Patent No.: US 12,753,857 B1
(45) Date of Patent: Oct. 6, 2026

(54) SLEEVE FOR SECURING A VALVE ASSEMBLY

(71) Applicant: SNF INC, Riceboro, GA (US)

(72) Inventors: Colin Nicholson, Riceboro, GA (US); Paul Fields, Riceboro, GA (US); Stacy Hamlin, Riceboro, GA (US); Johann Kieffer, Andrezieux-Boutheon (FR)

(73) Assignee: SNF INC

( * ) Notice: Subject to any disclaimer, the term of this patent is extended or adjusted under 35 U.S.C. 154(b) by 0 days.

(21) Appl. No.: 19/198,707

(22) Filed: May 5, 2025

(51) Int. Cl.

| | |
|---|---|
| ***F16K 35/06*** | (2006.01) |
| ***F16K 35/10*** | (2006.01) |
| ***F16L 15/08*** | (2006.01) |
| ***F16L 19/00*** | (2006.01) |
| *F16K 27/06* | (2006.01) |

(52) U.S. Cl.
CPC .............. *F16K 35/06* (2013.01); *F16K 35/10* (2013.01); *F16L 15/08* (2013.01); *F16L 19/005* (2013.01); *F16K 27/067* (2013.01)

(58) Field of Classification Search
CPC ......... F16L 21/06; F16L 19/005; F16L 15/08; F16K 27/067; F16K 35/06; F16K 35/10; F16K 35/12
See application file for complete search history.

(56) References Cited

U.S. PATENT DOCUMENTS 3,980,099 A * 9/1976 Youngblood ........... F16K 35/10 137/384
4,736,765 A * 4/1988 Campbell ................. E03B 9/06 137/382
5,360,036 A * 11/1994 Kieper .................... F16K 35/06 137/625.21
5,360,241 A * 11/1994 Gundy .................... F16L 47/30 285/915
6,709,020 B2 * 3/2004 Workman ............. F16L 19/005 285/179
7,980,598 B2 * 7/2011 Tsubota ................ F16L 19/046 70/180
11,428,351 B2 8/2022 Kogure

FOREIGN PATENT DOCUMENTS

CN 118188924 A 6/2024
EP 0704652 A1 4/1996
KR 200449225 Y1 3/2010

(Continued)

*Primary Examiner* — James M Hewitt, II
(74) *Attorney, Agent, or Firm* — IPSILON USA, LLP

(57) ABSTRACT

A sleeve is provided for securely immobilizing two compression nuts of a valve assembly. Each compression nut is located at one end of the valve assembly. The sleeve is a one-piece open sleeve and has, on each end of the sleeve, an inner surface with a female spline, each female spline being adapted to match the male spline of the outer surface of one of the compression nuts, The sleeve has a through hole opening on one end of the sleeve, the through hole being configured to accommodate a bonnet of the valve assembly. A valve unit includes a valve assembly and the sleeve. A method is also provided for securely immobilizing two compression nuts of a valve assembly, utilizing the sleeve. The sleeve is particularly useful to efficiently secure a valve assembly, the sleeve being easy to make and simple to use.

8 Claims, 5 Drawing Sheets

(56) References Cited

FOREIGN PATENT DOCUMENTS

| | | | |
|---|---|---|---|
| KR | 101231873 | B1 | 1/2013 |
| KR | 101314494 | B1 | 4/2013 |
| KR | 101773742 | B2 | 10/2013 |
| KR | 200471300 | Y1 | 2/2014 |
| KR | 101458370 | B1 | 11/2014 |
| KR | 20180003123 | U | 10/2018 |
| KR | 102135898 | B1 | 2/2020 |
| KR | 102435284 | B1 | 8/2022 |

* cited by examiner

SLEEVE FOR SECURING A VALVE ASSEMBLY

TECHNOLOGICAL FIELD

The present invention relates to an open sleeve for securely immobilizing two compression nuts of a valve assembly. The present invention also refers to a method for securely immobilizing two compression nuts of a valve assembly, wherein the open sleeve is used. The open sleeve is particularly useful to avoid movement of the compression nuts of a valve assembly over time, especially when the valve assembly is subject to vibrations.

BACKGROUND

Valves assemblies are commonly placed between two fluid conduits, such as pipes. Valve assemblies can be used to allow the passage of a fluid from one conduit to another, to regulate, or to prevent such passage. The valve assembly is usually connected to the fluid conduits by means of conventional end connectors, the connection between the connectors and the valve assembly being tightened with compression nuts, in order to prevent leakage of fluid. For instance, the end connectors of the fluid conduits are provided with generally radially outwardly extending flanges cooperating with radially inwardly extending flanges disposed on the compression nuts, and the compression nuts are provided with an internal threading cooperating with an external threading of the body of the valve assembly. An example of such a valve assembly is presented in U.S. Pat. No. 5,360,036A.

In industrial and chemical manufacturing processes, valves are often subjected to constant vibrations over long periods, causing the screw threads on the valve compression fittings to loosen or "wind off." This leads to potential chemical leaks, safety hazards, environmental risks, and downtime for repairs. While vibration can be reduced and thread tightness checked, both are operationally difficult and can encompass hundreds of valves for a single installation.

U.S. Pat. No. 11,428,351B2, EP0704652A1, KR101231873B1, CN118188924A and KR102135898B1 offer different solutions to this problem with devices acting for in each of these solutions on one side of the valve assembly, i.e. on one compression nut. Consequently, these solutions are not efficient when used for both sides of the valve assembly.

KR101458370B1, KR200449225Y1, KR101314494B1, KR101773742B2 and KR102435284B1 propose locking systems that are each designed specifically for one type of valve. These systems are not compatible with other types of valves.

KR200471300Y1 and KR20180003123U offer solutions that are compatible with different types of valves, and allow the locking of the compression nuts located on both ends of the valves. However, for both solutions, the manufacturing process is complicated, and the mounting method is complex.

SUMMARY

The present invention aims at solving these disadvantages by proposing a sleeve for securely immobilizing two compression nuts of a valve assembly, said valve assembly comprising one compression nut at each of its ends, said compression nuts each comprising a male spline located on an outer surface, said valve assembly comprising a bonnet, said sleeve being a one-piece open sleeve and comprising:

- on each end of the sleeve, an inner surface comprising a female spline, each female spline being adapted to match the male spline of the outer surface of one of the compression nuts, and
- a through hole, opening on one end of the sleeve, said through hole being configured to accommodate said bonnet of said valve assembly.

Thanks to these provisions, the compression nuts are securely immobilized, and there is no need to routinely check that they are properly tightened, even when the fluid conduits connected to the valve assembly are subject to vibrations. This is achieved by a sleeve which is easy to manufacture, and very simple to use, whether for mounting the sleeve on a valve assembly, or dismounting the sleeve from a valve assembly. The mounting and dismounting of the sleeve can be achieved without any tool, and take less than five minutes each.

The through hole may be located in the middle of the section of the sleeve.

Said sleeve may comprise two grooves, each groove being located on the outer surface of one of both ends of the sleeve, and said sleeve may comprise two tie straps, each groove being configured to accommodate one of the two tie straps. When the sleeve is mounted on the valve assembly, the tie straps, when tightened around the grooves, ensure even pressure distribution around the compression nuts, which reduces the risks of leaks.

The sleeve may further comprise at least one protrusion, said at least one protrusion being located on the inner surface of the sleeve, said at least one protrusion being configured to make contact with one of the compression nuts when the sleeve is assembled with said valve assembly, which helps the operator to correctly place the sleeve relative to the valve assembly, and prevents the sleeve from slipping down when the sleeve is used vertically, i.e. when the fluid conduits connected to the valve assembly are vertical.

The female splines located on each end of the sleeve may join to form one single female spline extending over the whole length of the sleeve, which makes the sleeve easier to manufacture, and easier to use.

The present invention also relates to a valve unit comprising a valve assembly and the sleeve of the invention, said valve assembly comprising one compression nut at each of its ends, said compression nuts each comprising a male spline located on an outer surface, said valve assembly comprising a bonnet, said compression nuts being immobilized by said sleeve.

Thanks to these provisions, the compression nuts are securely immobilized, and there is no need to routinely check that they are properly tightened, even when the fluid conduits connected to the valve assembly are subject to vibrations. This is achieved by a sleeve which is easy to manufacture, and very simple to use, whether for mounting the sleeve on a valve assembly, or dismounting the sleeve from a valve assembly. The mounting and dismounting of the sleeve can be achieved without any tool, and take less than five minutes each.

The present invention also relates to a method for securely immobilizing two compression nuts of a valve assembly, utilizing the sleeve of the invention, comprising the following steps:

- tightening two compression nuts, each compression nut being located at one end of said valve assembly,
- if needed, rotating each compression nut until the male splines of the compression nuts are ready to be aligned with the female splines of the sleeve, with the position of the through hole of the sleeve matching the position of the bonnet of the valve assembly, sliding the sleeve on the valve assembly, the bonnet of the valve assembly passing through the through hole, the male splines of the compression nuts engaging the female splines of the sleeve.

Thanks to these provisions, the compression nuts are securely immobilized, and there is no need to routinely check that they are properly tightened. This is achieved by a sleeve which is easy to manufacture, and very simple to use, whether for mounting the sleeve on a valve assembly, or dismounting the sleeve from a valve assembly. The mounting and dismounting of the sleeve can be achieved without any tool, and take less than five minutes each.

The present invention also relates to a method for securely immobilizing two compression nuts of a valve assembly, utilizing the sleeve of the invention, comprising the following steps:

tightening two compression nuts, each compression nut being located at one end of said valve assembly, if needed, rotating each compression nut until the male splines of the compression nuts are ready to be aligned with the female splines of the sleeve, with the position of the through hole of the sleeve matching the position of the bonnet of the valve assembly, sliding the sleeve on the valve assembly, the bonnet of the valve assembly passing through the through hole, the male splines of the compression nuts engaging the female splines of the sleeve, wrapping and tightening a tie strap around each groove of the sleeve.

Thanks to these provisions, the tie straps ensure even pressure distribution around the compression nut, which reduce the risks of leak.

The present invention also relates to a method for securely immobilizing two compression nuts of a valve assembly, utilizing the sleeve of the invention, comprising the following steps:

tightening two compression nuts, each compression nut being located at one end of said valve assembly, if needed, rotating each compression nut until the male splines of the compression nuts are ready to be aligned with the female splines of the sleeve, with the position of the through hole of the sleeve matching the position of the bonnet of the valve assembly, sliding the sleeve on the valve assembly, the bonnet of the valve assembly passing through the through hole, the male splines of the compression nuts engaging the female splines of the sleeve, until said at least one protrusion of the sleeve 1 makes contact with one of the compression nuts.

Thanks to these provisions, optimal placement of the sleeve relative to the valve assembly is ensured.

DETAILED DESCRIPTION

Figure 1:
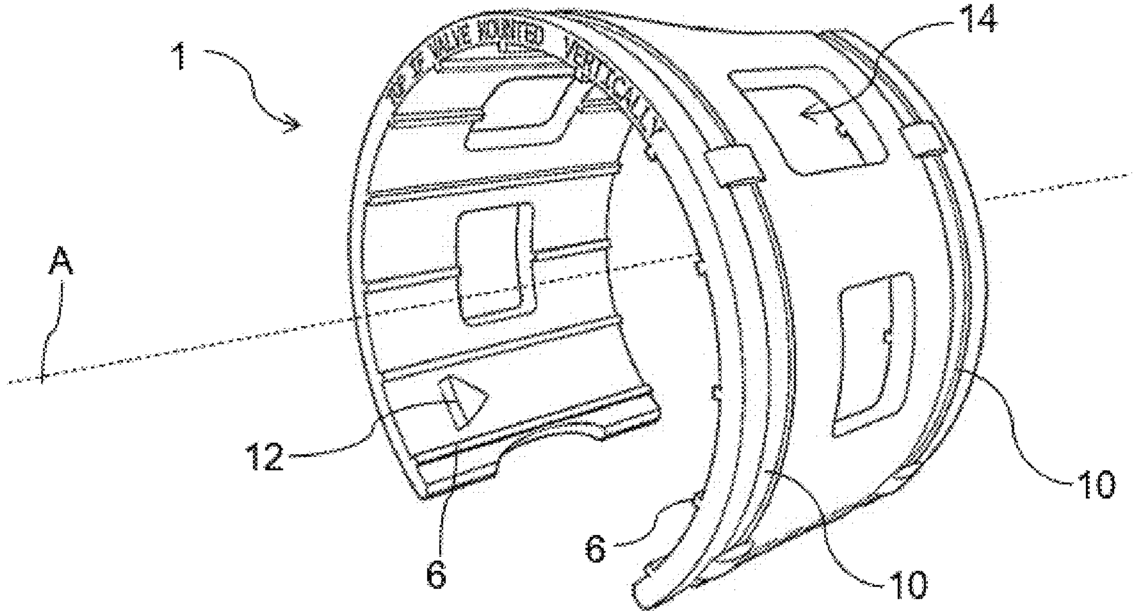
FIG. 1 is a perspective front view of a sleeve according to a preferred embodiment of the invention.
Figure 2:
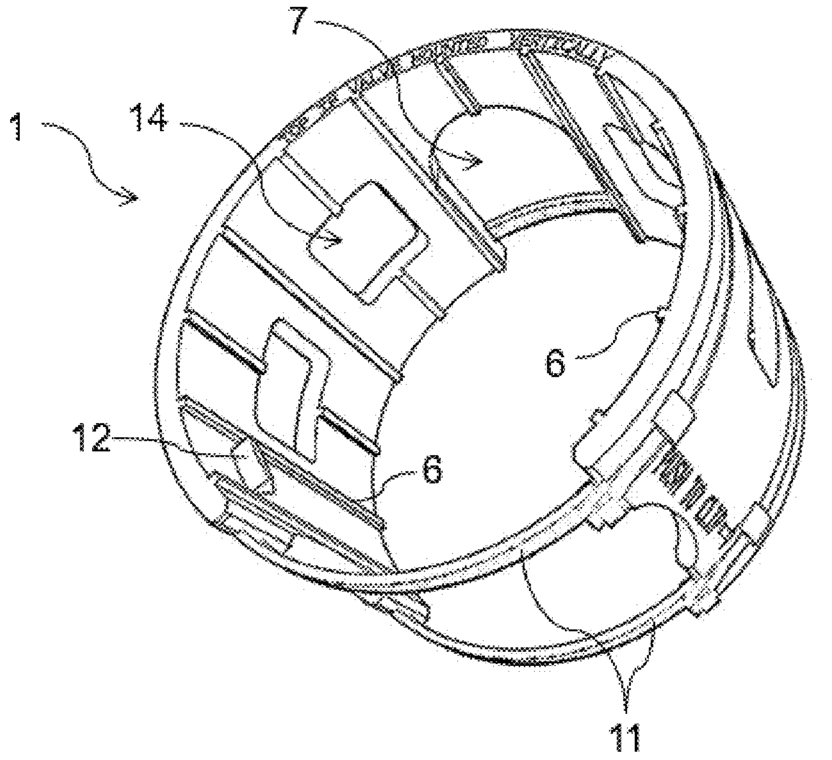
FIG. 2 is a perspective front view of the sleeve of FIG. 1, with tie straps.
Figure 3:
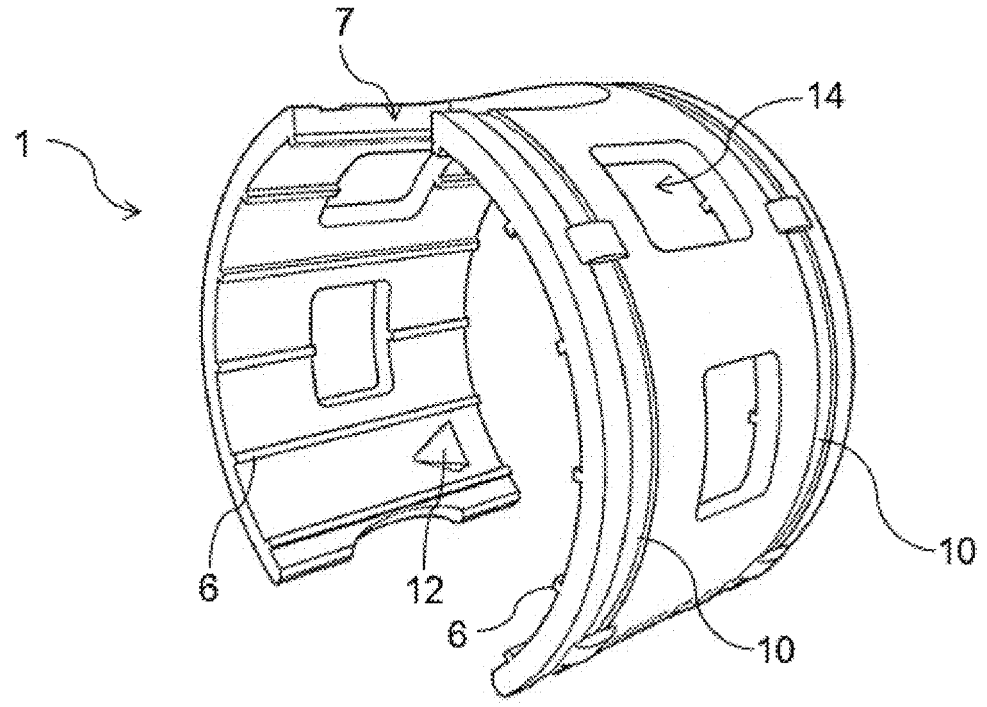
FIG. 3 is a perspective rear view of the sleeve of FIG. 1.
Figure 4:
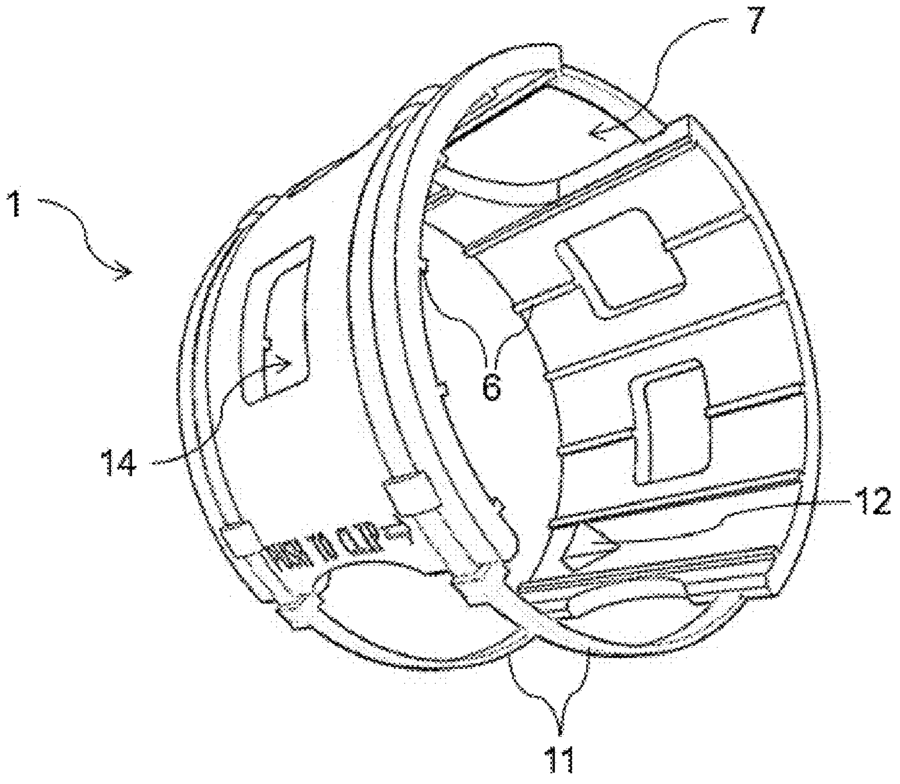
FIG. 4 is a perspective rear view of the sleeve of FIG. 1, with tie straps.
Figure 5:
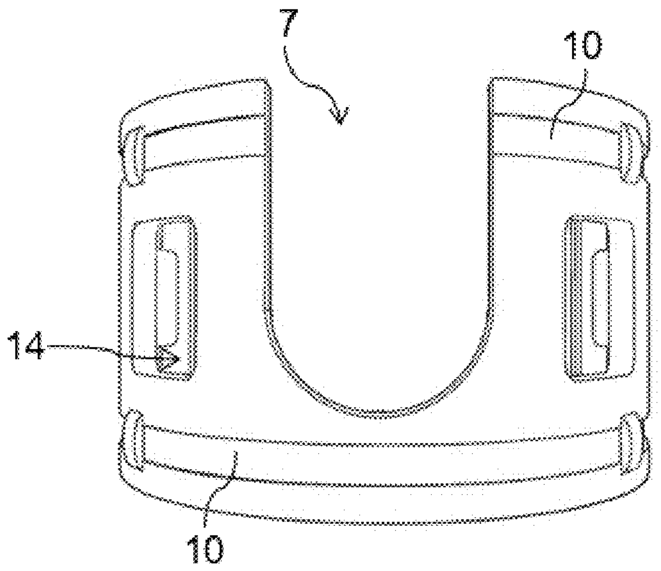
FIG. 5 is a top view of the sleeve of FIG. 1.

Referring to FIGS. 1 to 9, the sleeve 1 according to the invention is configured to securely immobilize two compression nuts 2 of a valve assembly. The valve assembly is connected to two fluid conduits at its extremities, the two fluid conduits being aligned and parallel to the main axis A of the valve assembly. When referring to the main axis A in relation to the sleeve 1, the main axis A corresponds to the main axis A of the valve assembly when the sleeve 1 is mounted on the valve assembly, in a position to immobilize the compression nuts 2. In the present description, the ends of the valve assembly and the ends of the sleeve designate the ends relative to the main axis A of the valve assembly.

The valve assembly is for instance an industrial ball valve, comprising a hollow, perforated, and pivoting ball to control fluid flowing through it. The valve assembly may be a thermoplastic valve, such as a CHEMTROL® valve. The valve assembly may correspond to the valve assembly described in U.S. Pat. No. 5,360,036A.

The valve assembly comprises two compression nuts 2, located at each end of the valve assembly. Each compression nut 2 allows the secure connection of the valve assembly to a fluid conduit, such as a pipe. The compression nuts 2 each comprise an outer surface comprising a male spline, and preferably, they comprise a threaded inner surface. For instance, the male spline of a compression nut 2 may have a generally cylindrical surface, interrupted by regularly distributed channels 4, the channels 4 being parallel to the axis of rotation of the compression nut 2, as can be seen on FIGS. 8 and 9. Other types of male splines can be used with a sleeve 1 according to the invention.

The valve assembly also comprises a bonnet 8. The bonnet 8 is the component that covers the opening through which the stem passes, the stem being a slender rod or shaft that transmits motion from the actuator or handle 13 to the valve internal mechanism, for example the ball, allowing it to open or close. The bonnet 8 usually has a substantially cylindrical shape, extending in a direction perpendicular to the main axis A of the valve assembly.

The sleeve 1 is an open sleeve, which means that it has a substantially cylindrical shape, the cylinder being opened on one side. In other words, the section of the sleeve 1 is substantially an arc of a circle with an angle greater than 180°, for example comprised between 250 and 320 degrees, preferably between 275 and 295 degrees.

The sleeve 1 is a one-piece element, which means that it is made from a single piece of material, without elements that may be separated from each other during normal use. The sleeve 1 may be made of a thermoplastic such as PTFE (Polytetrafluoroethylene). It may be fabricated by any known method such as injection molding, vacuum casting, extrusion, CNC (Computer Numerical Control) machining, 3D printing, etc.

The material of the sleeve 1 may be chosen so that the sleeve 1 has a certain elasticity, allowing the radius of its substantially cylindrical open section to increase. This way, the open part of the section of the sleeve 1 can be widened, to facilitate mounting of the sleeve 1 and dismounting of the sleeve 1 on the valve assembly.

The sleeve 1 comprises, on each of its ends, an inner surface comprising a female spline adapted to match the male spline of the outer surface of one of the compression nuts 2. For instance, if the male spline has a generally cylindrical surface, interrupted by regularly distributed channels 4, the female spline will have a generally cylindrical surface, interrupted by regularly distributed tongues 6, the channels 4 being adapted to accommodate the tongues 6. The sleeve 1 being an open sleeve, the female splines do not cover the entirety of the male splines, which extend over 360°. Preferably, the female splines cover the entire open section of the sleeve 1.

Figure 6:
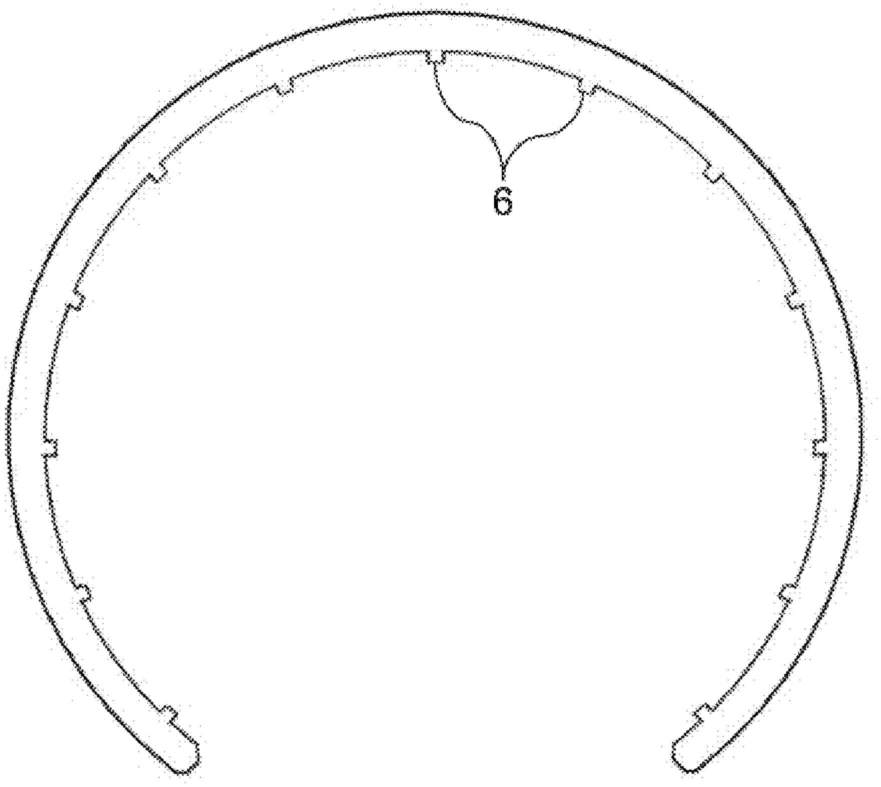
FIG. 6 is a cross-sectional view of the sleeve of FIG. 1.
Figure 7:
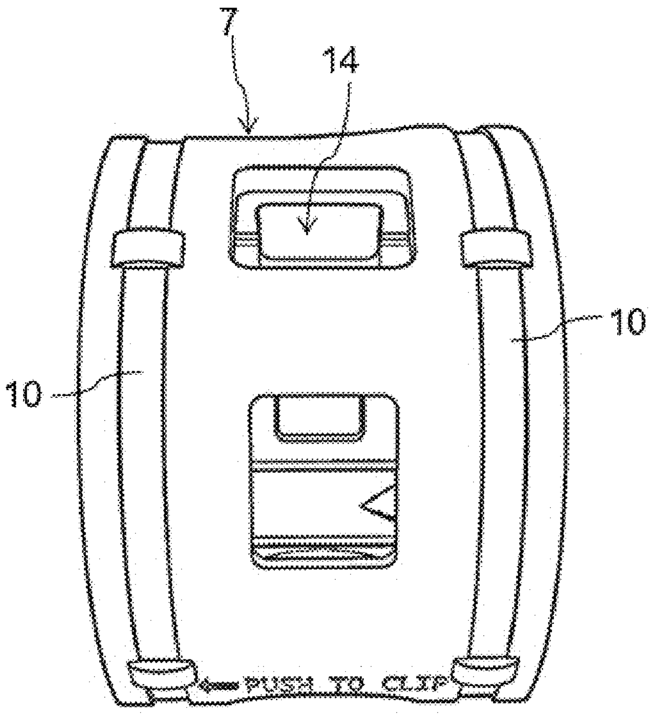
FIG. 7 is a side view of the sleeve of FIG. 1.
Figure 8:
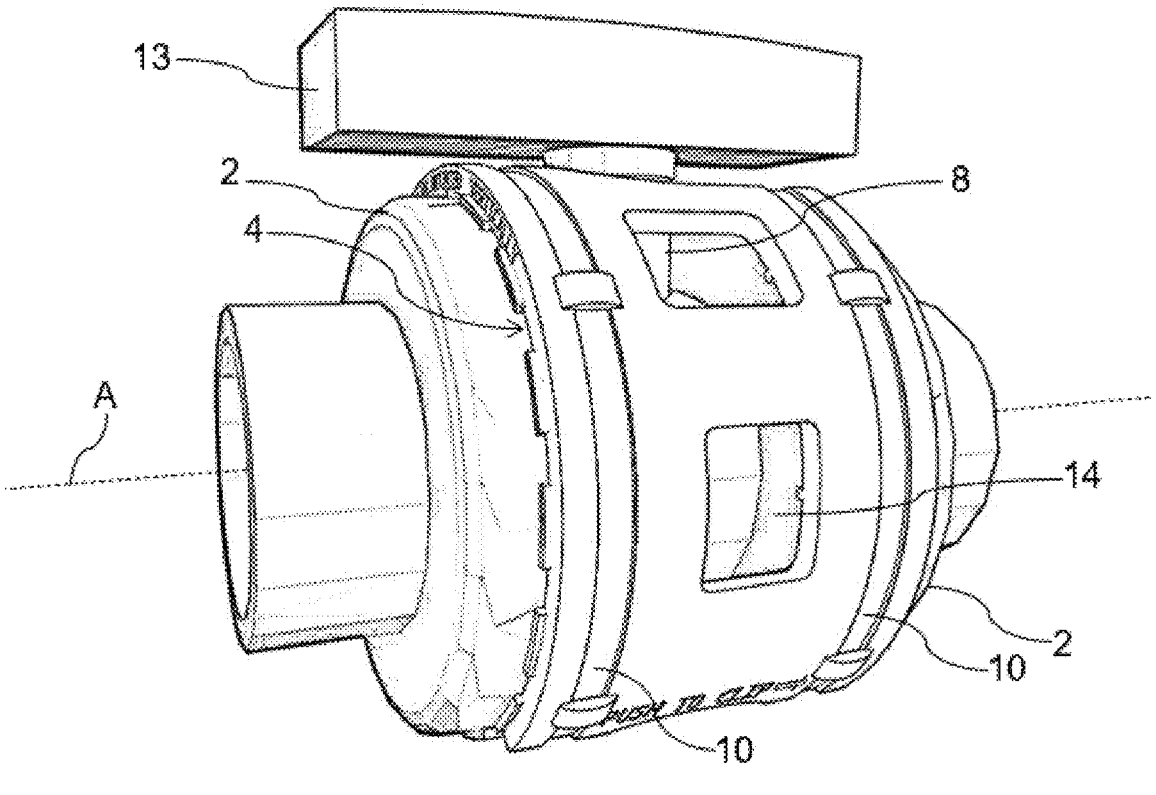
FIG. 8 is a perspective front view of the sleeve of FIG. 1, mounted on a valve assembly.
Figure 9:
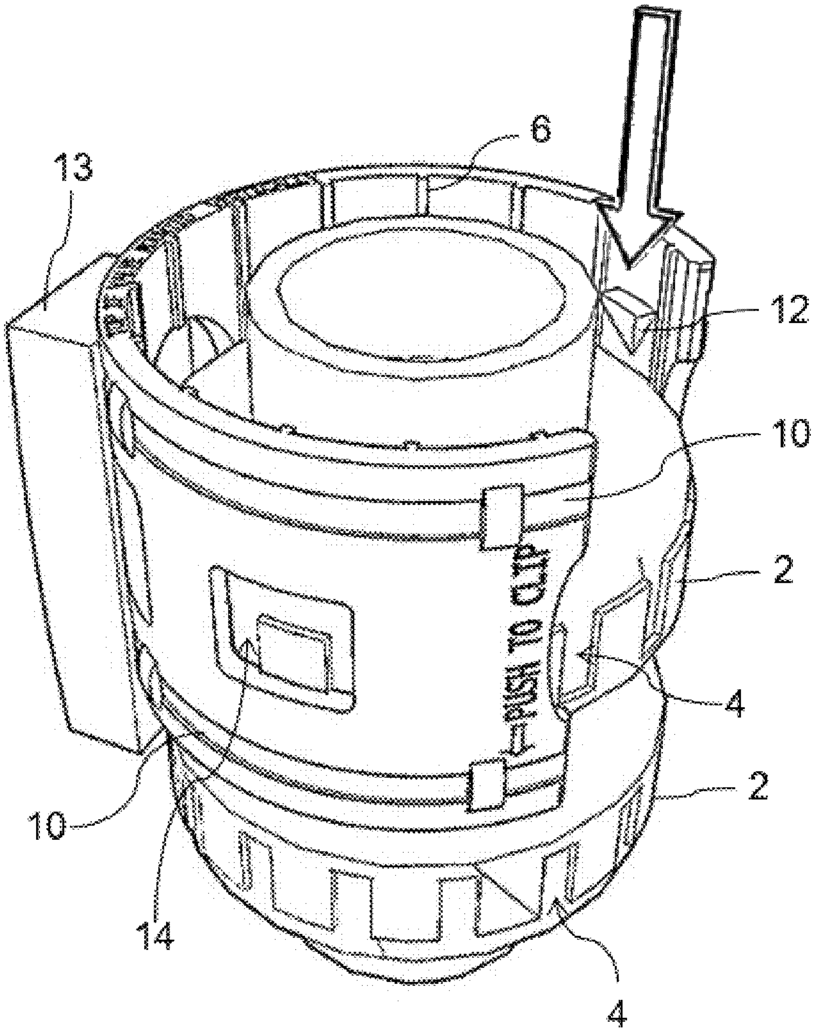
FIG. 9 is a perspective top view of the sleeve of FIG. 1, being mounted vertically on a valve assembly.

For instance, as in the example illustrated on FIG. 6, the male splines each comprise 16 evenly distributed channels 4, and the female splines each comprise 11 to 15 tongues 6, for example 13 tongues.

In order to facilitate the fabrication and the use of the sleeve 1, the female splines located on both ends of the sleeve 1 may form one single female spline extending over the whole length of the sleeve 1, as illustrated as an example on FIGS. 1 to 4.

The sleeve 1 also comprises a through hole 7 configured to accommodate the bonnet 8 of the valve assembly.

The through hole 7 is preferably located in the middle of the open section of the sleeve, in order to reduce its impact on the mechanic resistance of the sleeve 1. In other words, the through hole 7 is preferably located in the middle of the arc section of the sleeve.

The sleeve 1 may comprise two grooves 10. The grooves 10 are each located on the outer surface of one of the ends of the sleeve 1. Each groove is for example located between 2 and 60 mm from each extremity of the sleeve 1. The grooves 10 are adapted to accommodate tie straps 11. Once the sleeve 1 is mounted on the valve assembly, the tie straps 11 may be tightened, to ensure a uniform repartition of the pressure of the sleeve 1 over the circumference of the compression nuts 2. The tie straps 11 may be made of stainless steel, or any other material offering the required elasticity and mechanical resistance, such as a plastic, for example nylon or polyamide.

The sleeve 1 may comprise at least one protrusion 12 located on its inner surface. The protrusion 12 is configured to make contact with one of the compression nuts when the sleeve 1 is properly mounted on the valve assembly. The protrusion 12 therefore helps the correct placement of the sleeve relative to the valve assembly. Moreover, when the sleeve is arranged vertically, i.e. when the main axis A of the valve assembly is vertical, as illustrated on FIG. 9, the protrusion 12 prevents the sleeve 1 to slip relatively to the valve assembly. To this end, the sleeve 1 may comprise a reference indicating the end of the sleeve that needs to be placed on top in case of vertical placement of the sleeve 1. As illustrated on FIG. 9, the protrusion 12 may present a shape allowing the sleeve 1 to slide on the valve assembly in only one direction, providing a clip effect when mounting the sleeve 1 on the valve assembly. Preferably, the sleeve 1 comprises at least two protrusions 12, each protrusion 12 being located at the same distance from the end of the arc formed by the section of the sleeve 1.

As illustrated on FIGS. 1 to 5 and 7 to 9, the sleeve 1 may comprise scooped-out parts 14. The scooped-out parts 14 have the effects of lightening the sleeve, and reduce material consumption when fabrication the sleeve 1.

The sleeve 1 may be used in a method for securely immobilizing two compression nuts 2 of a valve assembly, comprising the following steps:

- tightening two compression nuts 2, each compression nut 2 being located at one end of the valve assembly. The tightening may be performed manually, or with a tool, if needed, rotating each compression nut 2 until the male splines of the compression nuts 2 are ready to be aligned with the female splines of the sleeve 1, with the position of the through hole 7 of the sleeve 1 matching the position of the bonnet 8 of the valve assembly. It is important to make sure that this step does not result in untightening one of the compression nuts 2 until it is less tight than required during operation of the valve assembly,
- sliding the sleeve 1 on the valve assembly, the bonnet 8 of the valve assembly passing through the through hole 7, the male splines of the compression nuts 2 engaging the female splines of the sleeve 1. If the sleeve 1 comprises at least one protrusion 12, as described above, the sliding may be done until the protrusion 12 makes contact with one of the compression nuts 2, ensuring correct positioning of the sleeve 1 relative to the valve assembly.
- if the sleeve 1 comprises grooves 10 and tie straps 11, as described above, wrapping and tightening a tie strap 11 around each groove 10 of the sleeve 1.

Once the sleeve 1 is mounted on the valve assembly, the compression nuts 2 are securely immobilized. Because of the matching between male splines and female splines, the compression nuts 2 cannot rotate relative to the sleeve 1. The female splines cooperating with each compression nuts 2 being both parts of a unique sleeve 1, the female spline on one end of the sleeve 1 cannot rotate without the rotation of the female spline on the other end of the sleeve 1. Finally, the compression nuts 2 being mounted in a symmetrical manner relatively to the center of the valve assembly, the direction of rotation to untighten one compression nut 2 corresponds to the direction of rotation to tighten the other compression nut 2. So once the sleeve 1 mounted on the valve assembly, if a first compression nut 2 tends to untighten, the same movement will tend to tighten the second compression nut 2, the tightening of the second compression nut 2 offering a resistance to the untightening of the first compression nut 2, and ultimately preventing the first compression nut 2 to reach an unsafe level of tightening.

The invention claimed is:

1. A sleeve for securely immobilizing two compression nuts of a valve assembly, said valve assembly comprising:
- one compression nut at each of its ends, said compression nuts each comprising a male spline located on an outer surface, said valve assembly comprising a bonnet, said sleeve being a one-piece open sleeve and comprising:
  - on each end of the sleeve, an inner surface comprising a female spline, each female spline being adapted to match the male spline of the outer surface of one of the compression nuts,
  - a through hole, opening on one end of the sleeve, said through hole being configured to accommodate said bonnet of said valve assembly, and
  - two grooves, each groove being located on the outer surface of one of both ends of the sleeve, said sleeve comprising two tie straps, each groove being configured to accommodate one of the two tie straps.

2. The sleeve of claim 1, wherein the through hole is located in a middle of an open section of the sleeve.

3. The sleeve of claim 1, wherein the sleeve further comprises at least one protrusion, said at least one protrusion being located on the inner surface of the sleeve, said at least one protrusion being configured to make contact with one of the compression nuts when the sleeve is assembled with said valve assembly.

4. The sleeve of claim 1, wherein the female splines located on each end of the sleeve join to form one single female spline extending over the whole length of the sleeve.

5. A valve unit having a valve assembly, and the sleeve of claim 1, said valve assembly comprising:

one compression nut at each of its ends, said compression nuts each comprising a male spline located on an outer surface, said valve assembly comprising a bonnet, said compression nuts being immobilized by said sleeve.

6. A method for securely immobilizing two compression nuts of a valve assembly, utilizing the sleeve of claim 1, comprising the following steps:

tightening two compression nuts, each compression nut being located at one end of said valve assembly, if needed, rotating each compression nut until the male splines of the compression nuts are ready to be aligned with the female splines of the sleeve, with the position of the through hole of the sleeve matching the position of the bonnet of the valve assembly, and sliding the sleeve on the valve assembly, the bonnet of the valve assembly passing through the through hole, the male splines of the compression nuts engaging the female splines of the sleeve.

7. A method for securely immobilizing two compression nuts of a valve assembly, utilizing the sleeve of claim 1, comprising the following steps:

tightening two compression nuts, each compression nut being located at one end of said valve assembly, if needed, rotating each compression nut until the male splines of the compression nuts are ready to be aligned with the female splines of the sleeve, with the position of the through hole of the sleeve matching the position of the bonnet of the valve assembly, and sliding the sleeve on the valve assembly, the bonnet of the valve assembly passing through the through hole, the male splines of the compression nuts engaging the female splines of the sleeve, wrapping and tightening a tie strap around each groove of the sleeve.

8. A method for securely immobilizing two compression nuts of a valve assembly, utilizing the sleeve of claim 3, comprising the following steps:

tightening two compression nuts, each compression nut being located at one end of said valve assembly, if needed, rotating each compression nut until the male splines of the compression nuts are ready to be aligned with the female splines of the sleeve, with the position of the through hole of the sleeve matching the position of the bonnet of the valve assembly, and sliding the sleeve on the valve assembly, the bonnet of the valve assembly passing through the through hole, the male splines of the compression nuts engaging the female splines of the sleeve, until said at least one protrusion of the sleeve 1 makes contact with one of the compression nuts.

* * * * *